(12) United States Patent
Takashima et al.

(10) Patent No.: US 9,182,860 B2
(45) Date of Patent: Nov. 10, 2015

(54) METHOD FOR DETECTING A CONTACT

(71) Applicant: SONY MOBILE COMMUNICATIONS JAPAN, INC., Minato-ku (JP)

(72) Inventors: Kouichiro Takashima, Tokyo (JP); Anatol Ward, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 97 days.

(21) Appl. No.: 13/722,316

(22) Filed: Dec. 20, 2012

(65) Prior Publication Data

US 2013/0201151 A1 Aug. 8, 2013

Related U.S. Application Data

(60) Provisional application No. 61/596,264, filed on Feb. 8, 2012.

(51) Int. Cl.
*G06F 3/041* (2006.01)
*G06F 3/044* (2006.01)
*G06F 3/0488* (2013.01)

(52) U.S. Cl.
CPC .............. *G06F 3/044* (2013.01); *G06F 3/0416* (2013.01); *G06F 3/0488* (2013.01); *G06F 2203/04108* (2013.01)

(58) Field of Classification Search
CPC ..... G06F 3/044; G06F 3/0488; G06F 3/0416; G06F 2203/04108
USPC .................................................. 345/173, 174
See application file for complete search history.

(56) References Cited

U.S. PATENT DOCUMENTS

| | | | |
|---|---|---|---|
| 6,067,079 A * | 5/2000 | Shieh ............................ | 345/173 |
| 6,492,979 B1 | 12/2002 | Kent et al. | |
| 8,799,821 B1 * | 8/2014 | De Rose et al. ............... | 715/848 |
| 2002/0025837 A1* | 2/2002 | Levy ............................. | 455/566 |
| 2003/0048260 A1* | 3/2003 | Matusis ........................ | 345/173 |

(Continued)

FOREIGN PATENT DOCUMENTS

| | | |
|---|---|---|
| JP | 2011-086122 | 4/2011 |
| WO | WO 01/95358 A2 | 12/2001 |

OTHER PUBLICATIONS

Extended European Search Report Issued May 28, 2013 in Patent Application No. 13151127.1.

*Primary Examiner* — Jonathan Boyd
(74) *Attorney, Agent, or Firm* — Oblon, McClelland, Maier & Neustadt, L.L.P.

(57) ABSTRACT

A touch panel device including a touch panel unit having transparent electrodes arranged in an X and Y direction; an electrical potential detection unit configured to scan the electrodes and detect electrostatic capacitance values in the X and Y direction; an object type detection unit configured to detect a type of object that has come within proximity to the surface of the touch panel unit on the basis of a distribution shape of the electrostatic capacitance values detected by the electrical potential detection unit; and an operation position detection unit configured to, based on the detected type of object, change a data extraction threshold value used to calculate a touch position of the object, and detect coordinates of a position at which the object has come within proximity to or come into contact with the surface of the touch panel unit based on the changed data extraction threshold value.

11 Claims, 13 Drawing Sheets

(56) References Cited

U.S. PATENT DOCUMENTS

| | | | |
|---|---|---|---|
| 2007/0256915 A1 | 11/2007 | Levy | |
| 2008/0042979 A1* | 2/2008 | Nikbin | 345/168 |
| 2008/0192024 A1 | 8/2008 | Mita | |
| 2010/0073325 A1* | 3/2010 | Yang | 345/174 |
| 2010/0117970 A1* | 5/2010 | Burstrom et al. | 345/173 |
| 2011/0074731 A1 | 3/2011 | Inoue et al. | |
| 2012/0105081 A1* | 5/2012 | Shaikh et al. | 324/686 |
| 2013/0113714 A1* | 5/2013 | Mao | 345/173 |
| 2013/0132903 A1* | 5/2013 | Krishnaswamy | 715/825 |

* cited by examiner

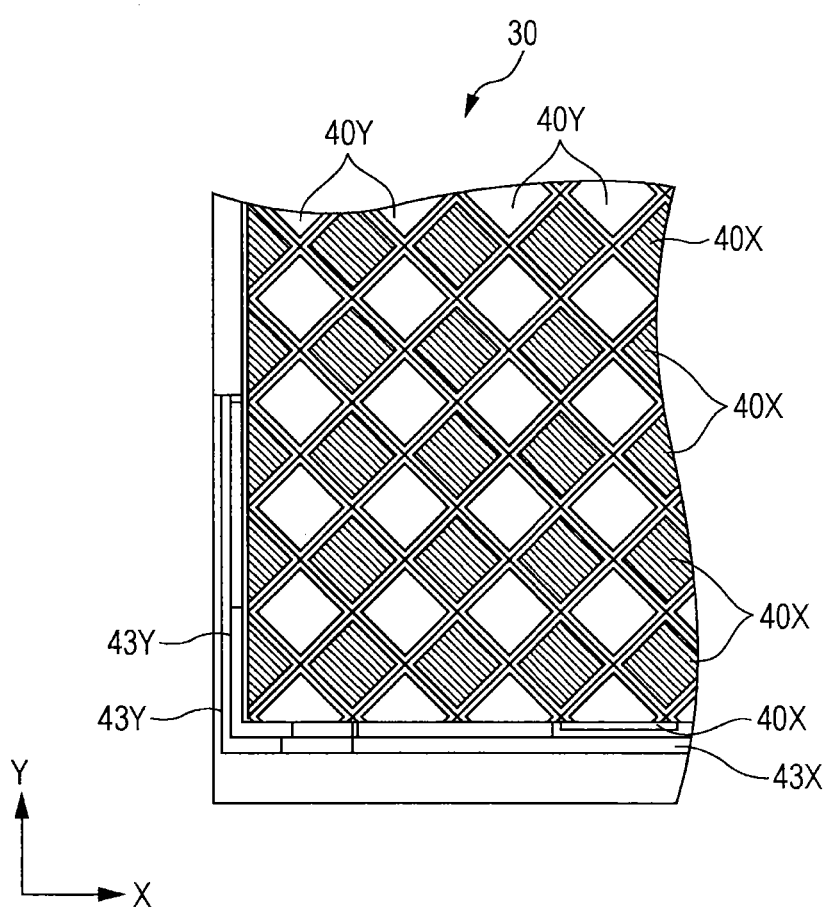

FIG. 13

| LIST OF APPLICATION RANGES | | WIDTH DETECTED IN X DIRECTION | | | | |
|---|---|---|---|---|---|---|
| | | 0 TO 3 mm | 3 TO 7 mm | 7 TO 20 mm | 20 TO 30 mm | 30 mm OR MORE |
| WIDTH DETECTED IN Y DIRECTION | 0 TO 3 mm | STYLUS | FINGER | FINGER | FINGER | |
| | 3 TO 7 mm | FINGER | FINGER | FINGER | FINGER | |
| | 7 TO 20 mm | FINGER | FINGER | FINGER | LARGE FINGER | |
| | 20 TO 30 mm | | | LARGE FINGER | | |
| | 30 mm OR MORE | | | | | |

METHOD FOR DETECTING A CONTACT

CROSS REFERENCE TO RELATED APPLICATIONS

This application is related to and claims priority under 35 U.S.C. §119(e) to Provisional Application Ser. No. 61/596,264, filed Feb. 8, 2012, the contents of which are hereby incorporated herein by reference.

BACKGROUND

1. Field

The present disclosure relates to a touch panel device capable of detecting a touch or an approach of a user's finger or the like by detecting, for example, a change in electrostatic capacitance, a mobile terminal including the touch panel device, a detection method therefor, and a recording medium and, more particularly, relates to a technology for improving the detection accuracy of operation input.

2. Description of the Related Art

Hitherto, touch panels that display an image on the screen thereof and that can be operated by an operator by directly touching the screen are known. Such touch panels are often used in mobile terminals, such as PDAs (Personal Digital Assistants), portable telephone terminals, or smartphones, in various household appliances, and the like. Types of touch panels include those having a resistance film method that detects a change in the resistance value of a touched portion, an electrostatic capacitance method that detects a change in the capacitance of a touched portion, and an electromagnetic induction method that detects the position of an indicator by using the electromagnetic energy of a dedicated indicator that generates a magnetic field. In particular, in the market of portable telephone terminals and smartphones, in recent years, the use of an electrostatic-capacitance-type touch panel has been increasing.

For example, PTL 1 discloses an electrostatic-capacitance-type touch panel. An electrostatic-capacitance-type touch panel sensor disclosed in this patent document includes a transparent base material, many transparent electrode units, and outer peripheral wiring positioned in the peripheral edge of the many transparent electrode units. The many transparent electrode units are arranged so as to be lined up in x and y directions on the top side surface of a transparent base material, and are formed of x-direction transparent electrode units that are connected through x-direction connection units in the x direction, and y-direction transparent electrode units that are positioned between x-direction transparent electrode units. The outer peripheral wiring is positioned in the peripheral edge of the many transparent electrode units, and is connected to the x-direction transparent electrode units and y-direction transparent electrode units. Adjacent y-direction electrode units themselves are connected through y-direction connection units that are arranged with an insulating layer in between above x-direction connection units. Then, the y-direction connection unit is formed together with the outer peripheral wiring by using the same material as the material of the outer peripheral wiring.

CITATION LIST

Patent Literature

[PTL 1] Japanese Unexamined Patent Application Publication No. 2011-86122

SUMMARY OF INVENTION

In such an electrostatic-capacitance-type touch panel, a determination is made as to the presence or absence of input made by a user's finger on the touch panel on the basis of the coordinate value and the electrostatic capacitance value when, for example, an object, such as a user's finger, comes close to the surface of a sensor of the touch panel. In addition, in an area where objects, such as a user's finger and a touch panel, are in contact with each other, by calculating the touch position, the coordinates on the touch panel at which an operation has been performed using a user's finger or the like are identified.

It is common practice for the calculation of the touch position to be performed by targeting all the electrostatic capacitance values that are obtained in the entire touched area between an object, such as a user's finger, and a touch panel, but the calculation is performed by using only the electrostatic capacitance values exceeding a certain signal level. That is, only electrostatic capacitance values exceeding a pre-provided predetermined threshold value are sampled, and the calculation of the touch position is performed. As a result of the above, it is possible to prevent noise components from being contained in data used to calculate the touch position.

This threshold value is often set relatively and fixedly with respect to a threshold value used for the determination of the presence or absence of a touching operation performed using an object, such as a user's finger, on a touch panel. Specifically, for example, a value smaller by a predetermined level than a threshold value for touch determination for determining the presence or absence of an object touching a touch panel is set as a threshold value for extracting touch position calculation data.

At this time, the difference value for a touch determination threshold value of a data extraction threshold value for calculating a touch position is set to a value at which an optimal touch position is obtained when, for example, an index finger of a person performs a touching operation. Specifically, a case in which an object of 7 mm, which is provisionally set as the diameter of a standard index finger of a person, is assumed, so that the difference value is set to a value at which an optimal touch position is calculated in this case. As a result of being set as described above, an unintended input by an ear of the user, the palm of a hand holding a terminal, or the like is not detected, thereby making it possible to detect only input that has been intentionally performed.

However, as a result of writing a detection algorithm in such a manner as to be calibrated with the index finger and exclude others as described above, a new problem arises. In a case where, for example, an input is made using an index finger or a thumb having a diameter larger than 7 mm, a child's finger having a diameter considerably smaller than 7 mm, or a pen, such as a stylus, having a diameter smaller than 3 mm, the touch position thereof is not appropriately calculated. That is, the coordinates at which the operation is performed cannot be correctly calculated.

The inventors of the present disclosure have recognized the necessity of automatically calculating an optimal touch position corresponding to the size of an object when an object having a certain diameter is brought into contact with a touch panel.

BRIEF SUMMARY

A touch panel device according to an embodiment of the present disclosure is configured to include an electrostatic-capacitance-type touch panel unit, an electrical potential detection unit, an object type detection unit, and an operation position detection unit, the configuration and the function of each unit are constituted as follows. In the electrostatic-capacitance-type touch panel unit, a plurality of transparent electrode units are arranged in X and Y directions. The electrical potential detection unit scans each of the plurality of transparent electrode units and detect a change in electrostatic capacitance values at coordinates in the X direction and in the Y direction. The object type detection unit detects the type of an object that comes within proximity to or comes into contact with the surface of the touch panel unit on the basis of the information obtained from the distribution shape of the electrostatic capacitance values that are detected by the electrical potential detection unit. The operation position detection unit changes the amount of data, or a data extraction threshold value, used to calculate the touch position in accordance with the type of the detected object. Then, the operation position detection unit detects the coordinates of the position at which the object comes within proximity to or comes into contact on the basis of the touch position calculated using the changed-amount data.

A mobile terminal according to an embodiment of the present disclosure is configured to include an electrostatic-capacitance-type touch panel unit, and a control unit having an electrical potential detection unit, an object type detection unit, and an operation position detection unit. The configuration and the function of each unit are constituted as follows. In the electrostatic-capacitance-type touch panel unit, a plurality of transparent electrodes are arranged in an X direction and in a Y direction. The electrical potential detection unit scans the plurality of transparent electrodes and detects a change in an electrostatic capacitance value at coordinates in the X direction and in the Y direction. The object type detection unit detects the type of an object that has come close to or come into contact with the surface of the touch panel unit on the basis of information obtained from a distribution shape of electrostatic capacitance values detected by the electrical potential detection unit. Similarly, the operation position detection unit inside the control unit varies the amount of data used to calculate the touch position of the object at a position at which the object that comes close to or comes into contact with the surface of the touch panel unit in accordance with the type of the object detected by the object type detection unit. Then, the operation position detection unit detects the coordinates of the position at which the object has come close or has come into contact on the basis of the touch position calculated using the changed-amount data.

In a detection method according to an embodiment of the present disclosure, first, each of a plurality of transparent electrode units of an electrostatic-capacitance-type touch panel unit in which a plurality of transparent electrode units are arranged in X and Y directions is scanned, and a change in electrostatic capacitance values at coordinates in the X and Y directions is detected. Next, the type of an object that comes close to or comes into contact with the surface of the touch panel unit is detected on the basis of the information obtained from the distribution shape of the detected electrostatic capacitance values. Next, the amount of data used to calculate the touch position of the object at the position at which the object has come close to or has come into contact with the surface of the touch panel unit is changed in accordance with the type of the detected object. Next, the coordinates of the position at which the object has come close or has come into contact are detected on the basis of the touch position calculated using the changed-amount data.

A recording medium according to an embodiment of the present disclosure has a program recorded thereon, the program causing a computer to perform processing including scanning a plurality of transparent electrodes of an electrostatic-capacitance-type touch panel unit in which a plurality of transparent electrodes are arranged in an X direction and in a Y direction, and detecting changes in electrostatic capacitance values at coordinates in the X direction and in the Y direction; detecting a type of an object that comes close to or comes into contact with a surface of the touch panel unit on the basis of information obtained from a distribution shape of the detected electrostatic capacitance values; and varying the amount of data used to calculate a touch position of the object in accordance with the type of the detected object, and detecting the coordinates of the position at which the object has come close or come into contact on the basis of the touch position calculated using the changed-amount data.

According to the present disclosures, the amount of data used to calculate the touch position of an object at a position at which the object that comes close to or comes into contact with the surface of the touch panel unit on the basis of the information obtained from the distribution shape of the detected electrostatic capacitance values is changed. Then, the coordinates at which the object comes close or comes into contact are detected on the basis of the touch position calculated using the changed-amount data.

According to the present disclosure, the extraction level of data used to calculate a touch position is changed on the basis of the information obtained from the distribution shape of the electrostatic capacitance values that change due to the diameter of an object, or the like. Consequently, an optimal touch position corresponding to the size of the object is automatically calculated.

BRIEF DESCRIPTION OF THE DRAWINGS

FIG. 2 schematically illustrates a state in which near a square transparent electrode unit of the embodiment of the present disclosure is expanded.

FIG. 13 is an illustration showing an example of the type of the object, which is recognized by a detection technique in an exemplary embodiment of the present disclosure.

DETAILED DESCRIPTION

A description will be given below of modes for carrying out the present disclosure (hereinafter referred to as embodiments). The description will be given in the following order.
1. Schematic configuration example of touch panel
2. Example of exterior configuration of mobile terminal to which touch panel is applied
3. Example of internal configuration of mobile terminal including touch panel
4. Method of calculating data extraction threshold value for calculating touch position
[1. Schematic Configuration of Touch Panel]

Figure 1A:
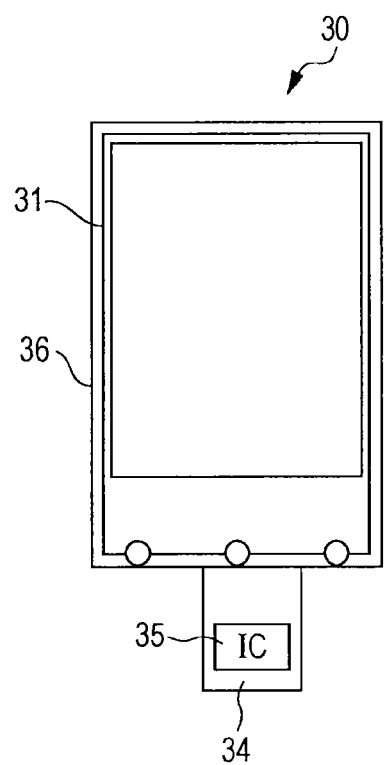
FIG. 1A and FIG. 1B illustrate a schematic configuration of an electrostatic-capacitance-type touch panel in an exemplary embodiment of the present disclosure.
Figure 1B:
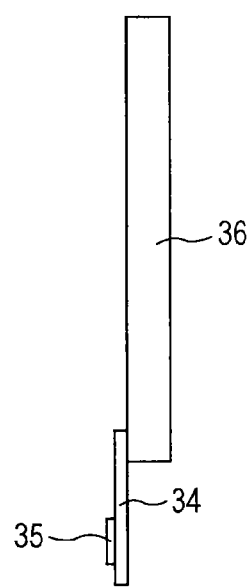

FIG. 1 illustrates a schematic configuration of a touch panel unit 30 of an embodiment of the present disclosure. FIG. 1A is a view when the touch panel unit 30 is viewed from the front, and FIG. 1B is a view when the touch panel unit 30 is viewed from the side. FIG. 2 illustrates a portion in which the touch panel unit 30 is partially expanded. The present disclosure is applied to an electrostatic-capacitance-type touch panel.

In FIG. 1A, the touch panel unit 30 is configured to have an X-Y transparent electrode pattern part 31, a flexible printed substrate 34, an IC (integrated circuit) 35 serving as a control unit, a sensor glass unit 36, and the like.

The X-Y transparent electrode pattern part 31 is formed on the surface of the sensor glass unit 36 formed from a transparent glass plate. For example, as shown in FIG. 2, a plurality of square transparent electrode units 40X are arranged in a plurality of columns in the X direction, and a plurality of square transparent electrode units 40Y are arranged in a plurality of columns in the Y direction.

Regarding the square transparent electrode units 40X, shown in FIG. 2, which are arranged in a plurality of columns in the X direction, the mutually adjacent square transparent electrode units 40X are connected by a connection unit formed of a transparent electrode. Similarly, regarding the square transparent electrode units 40Y, which are arranged in a plurality of columns in the Y direction, the mutually adjacent square transparent electrode units 40Y are connected by a connection unit.

Furthermore, each square transparent electrode unit 40X in one of the outermost edge portions among the square transparent electrode units 40X is connected to the outer edge wiring pattern 43X, and is connected to the wiring pattern of the flexible printed substrate 34 through the outer edge wiring pattern 43X. Similarly, the square transparent electrode unit 40Y in one of the outermost edge portions among the square transparent electrode units 40Y is connected to the outer edge wiring pattern 43Y, and is connected to the wiring pattern of the flexible printed substrate 34 through the outer edge wiring pattern 43Y.

The flexible printed substrate 34 is formed so as to have a wiring pattern that is connected to each of the outer edge wiring pattern 43X and the outer edge wiring pattern 43Y of the X-Y transparent electrode pattern part 31. In the case of the example shown in FIG. 1, the flexible printed substrate 34 is depicted in a state of being extended on the plane, but is not limited to this. For example, when the touch panel unit 30 is disposed within the housing of a mobile terminal or the like, the touch panel unit 30 is bent and is arranged at a predetermined position inside the housing of the mobile terminal.

An IC 35 is mounted on the flexible printed substrate 34, and is connected to the outer edge wiring pattern 43X and the outer edge wiring pattern 43Y of the X-Y transparent electrode pattern part 31 through a wiring pattern on the flexible printed substrate 34. The IC 35 includes a touch-panel scanning unit serving as an electrical potential detection unit, and an operation position detection unit (the illustrations of both of them are omitted in FIG. 1). The touch-panel scanning unit scans each of the square transparent electrode units 40X in the X direction and each of the square transparent electrode units 40Y in the Y direction of the X-Y transparent electrode pattern part 31, and detects a change in the electrostatic capacitances in the X and Y directions. In more detail, the touch-panel scanning unit calculates the coordinate value and the electrostatic capacitance value when an object, such as a user's finger, comes close to or touches the sensor surface of the touch panel unit 30.

The operation position detection unit calculates the touch position for an area of a touch panel touched by an object, such as a user's finger, and thus identifies the coordinates on the touch panel in which an operation has been performed using a user's finger or the like. As described above, when an object, such as a user's finger, comes close to the touch panel unit 30, electrostatic capacitance is formed between the X-Y transparent electrode pattern part 31 and the object. The value of the electrostatic capacitance increases as it is detected in an electrode at a position closer to the object.

Figure 3:
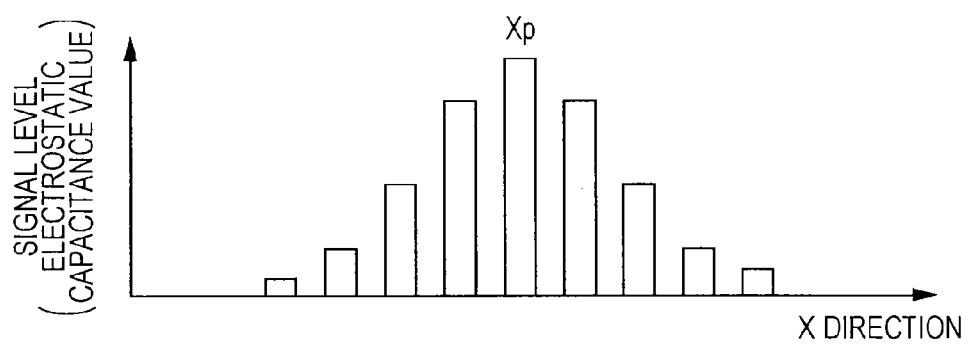
FIG. 3 illustrates an example of the X-direction distribution of signal levels of electrostatic capacitance values that are detected by a touch-panel scanning unit in an exemplary embodiment of the present disclosure.

FIG. 3 illustrates, in a graph, an example of the distribution of the electrostatic capacitance values in the X direction, which are formed between each electrode of the X-Y transparent electrode pattern part 31 and the object, the electrostatic capacitance values being detected by the touch-panel scanning unit of the IC 35. Here, for simplicity of description, a description will be given using a one-dimensional distribution table. FIG. 3 illustrates only an example of the distribution in the X direction. However, in practice, by referring to the information regarding the distribution in the Y axial direction, the calculation of the coordinates of the touch position is performed.

The horizontal axis in FIG. 3 represents the X direction of the X-Y transparent electrode pattern part 31, and the vertical axis represents the magnitude of the signal level of a detected electrostatic capacitance value. As the electrostatic capacitance value represented in the vertical axis, a digital value after A/D conversion is shown.

As shown in FIG. 3, the distribution of the electrostatic capacitance values that are detected by the touch-panel scanning unit becomes almost symmetrical about a peak Xp that is at the electrode position at which the electrostatic capacitance value peaks. As electrostatic capacitance values used for the calculation of the touch position, the electrostatic capacitance value that is obtained at the peak Xp, and also the electrostatic capacitance values obtained at a plurality of electrodes which are to the right and left of the peak Xp are used, making it possible to improve the accuracy of the touch position calculation. As the electrostatic capacitance value used to calculate the touch position, what electrodes having addresses to the right and left of the peak Xp, the peak Xp being at the center, are used, that is, the number of electrodes having the electrostatic capacitance values in the arrangement direction, which are used to calculate the touch position, can be changed depending on the magnitude of the threshold value provided for the signal level of the electrostatic capacitance value.

In the present disclosure, the magnitude of the threshold value is automatically optimized on the basis of the information obtained from the distribution shape in the X direction and in the Y axial direction of the electrostatic capacitance values that are detected by the touch-panel scanning unit. The details of the optimization method for the threshold value will be described later. Here, a description has been given of only the calculation of the touch position in the X direction of the X-Y transparent electrode pattern part 31. Additionally, the same calculation is also performed for the Y axial direction, and the final touch position is calculated on the basis of the values obtained for both the axial directions. In the following description, the approach of an object, such as a user's finger, to a sensor surface or the like will be referred to as a "touch".

[2. Example of Exterior Configuration of Mobile Terminal Including Touch Panel]

Figure 4:
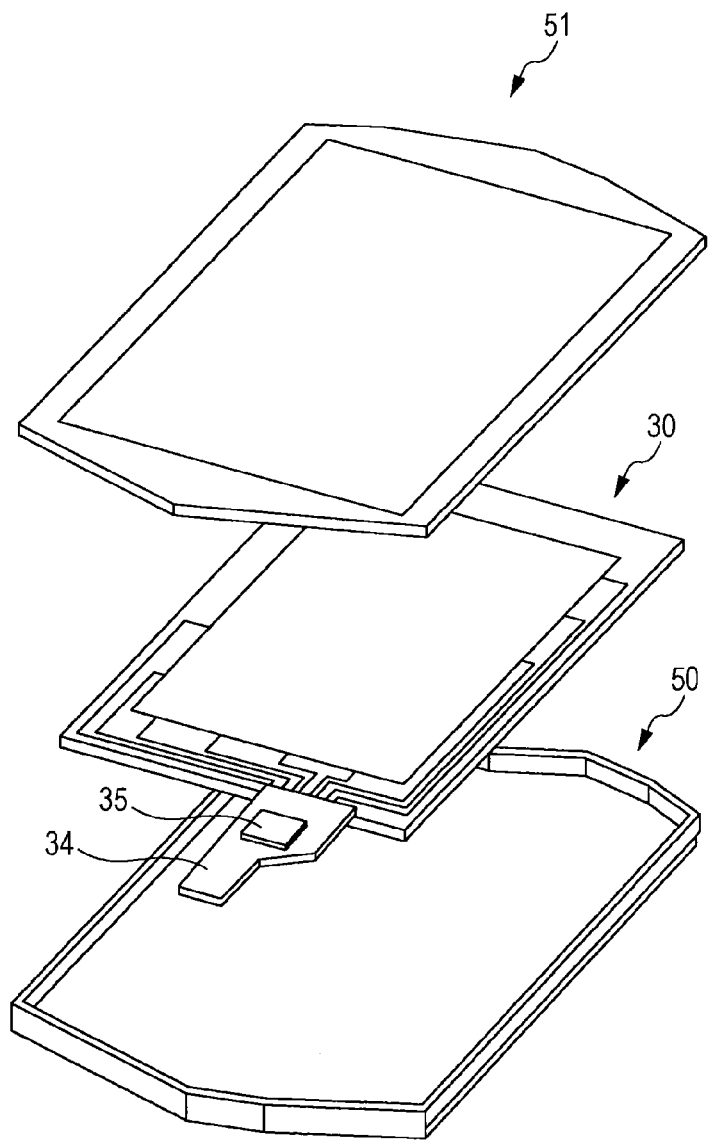
FIG. 4 is an exploded perspective view illustrating a schematic configuration example of a mobile terminal in an exemplary embodiment of the present disclosure.

Next, a description will be given, with reference to FIG. 4, of an example of the exterior configuration of a mobile terminal including a touch panel. FIG. 4 is an exploded perspective view illustrating an example of the configuration of a mobile terminal 1. The mobile terminal 1 is formed of a housing 50, a touch panel unit 30, and a window glass 51. The window glass 51 is mounted in a state in which the touch panel unit 30 is housed inside the housing 50, thereby forming a mobile terminal of the present embodiment. Furthermore, a flexible printed substrate 34 and an IC 35 are connected to the touch panel unit 30.

[3. Example of Internal Configuration of Mobile Terminal Including Touch Panel]

Next, a description will be given, with reference to FIG. 5, of an example of the internal configuration of a mobile terminal including a touch panel of the present disclosure.

Figure 5:
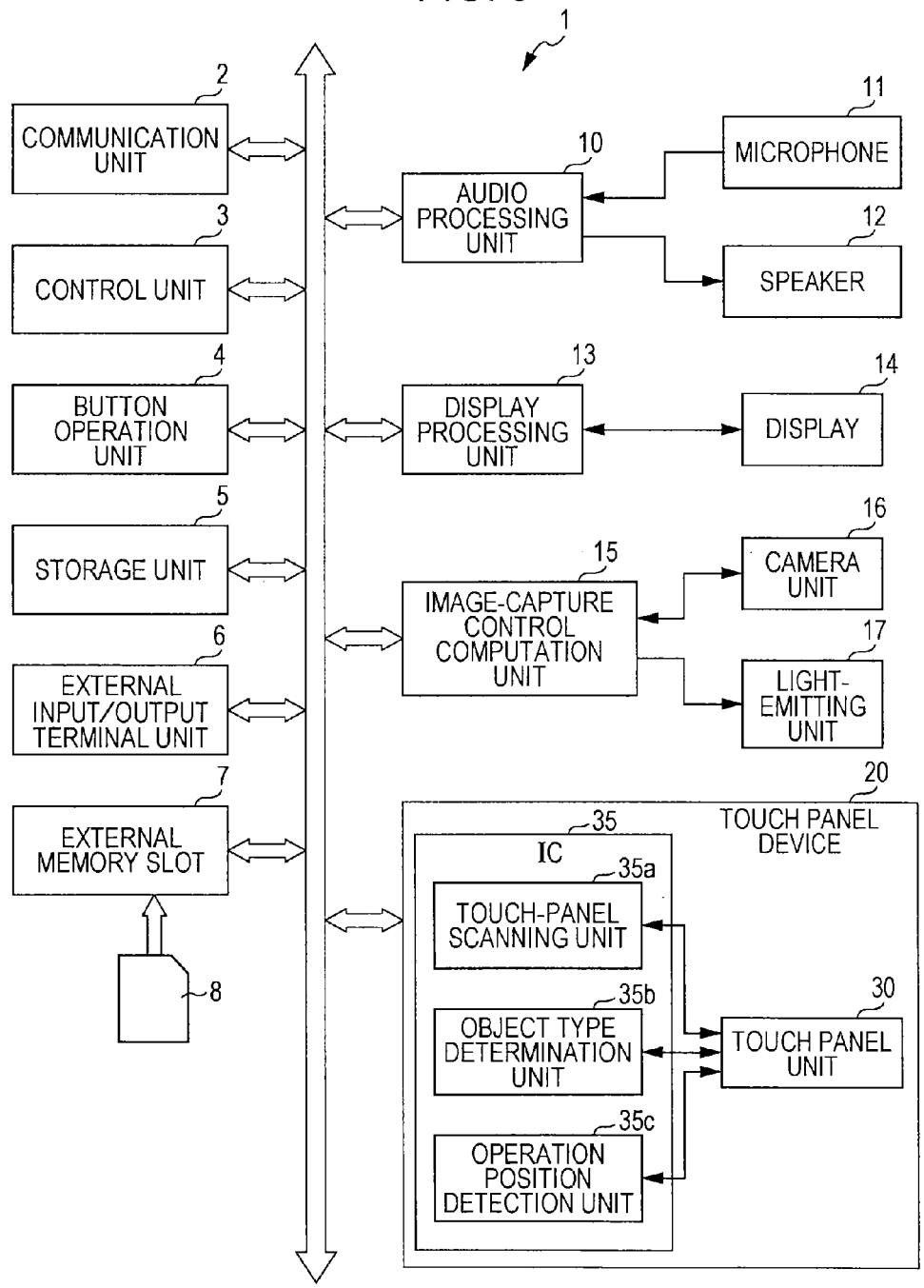
FIG. 5 is a schematic internal block configuration example illustrating a mobile terminal including a touch panel in an exemplary embodiment of the present disclosure.

FIG. 5 is a schematic block diagram illustrating an example of the internal configuration of the mobile terminal 1 including a touch panel device 20. In the present disclosure, an example in which a touch panel is applied to a mobile terminal is given, but the touch panel is not limited to this. As an example, the touch panel can be applied to a tablet terminal, a game machine, a music reproduction device, a digital still camera, and the like.

The mobile terminal 1 includes a communication unit 2, a control unit 3, a button operation unit 4, a storage unit 5, an external input/output terminal unit 6, and an external memory slot 7. Furthermore, the mobile terminal 1 includes an audio processing unit 10, a display processing unit 13, an image-capture control computation unit 15, the touch panel device 20, and the IC 35.

The communication unit 2 includes a communication unit for performing communication through a communication antenna, a portable telephone network, and a public wireless communication network. The control unit 3, which is formed of a main CPU (central processing unit), controls various units, such as the communication unit 2, the display processing unit 13, the audio processing unit 10, the external input/output terminal unit 6, the external memory slot 7, the image-capture control computation unit 15, and the IC 35, and performs various computations as necessary. The control unit 3 executes various programs stored in the storage unit 5, and the like. The execution of an operation control program and an application program on the basis of the output of the touch panel device 20 are performed by the control unit 3. Also, the control unit 3 makes a determination as to whether or not an operation intended by the user is performed on the basis of the size, the shape, and the like of the object detected by the touch panel device 20. The button operation unit 4 is constituted by hard keys provided on the housing of the mobile terminal 1 of the present embodiment, and a peripheral circuit thereof.

The storage unit 5 is formed of a built-in memory provided inside the mobile terminal 1, a removable card-shaped memory, and the like. Examples of a removable card-shaped memory include a card that stores so-called SIM (Subscriber Identity Module) information, and the like. The built-in memory is formed of a ROM and a RAM. The ROM is formed as a rewritable ROM. The ROM has stored therein an OS (Operating System), control programs for the control unit 3 to control the entirety and each unit of the mobile terminal 1, various application programs including operation control programs corresponding to the output of the touch panel device 20, furthermore, various initial set values, various data, and the like. The RAM serves as a work area and a buffer area when the control unit 3, the image-capture control computation unit 15, and the like perform various data processing, and stores data as desired.

The external input/output terminal unit 6 is formed of, for example, a cable connection connector and an interface circuit for external data communication used when performing data communication through a cable, and a charging terminal and a charging interface circuit therefor used when charging an internal battery through a power cable, and the like. The mobile terminal 1 of the present embodiment is configured to be able to obtain application programs including operation control programs according to the present embodiment, other various programs, and data from an external device connected to the external input/output terminal unit 6.

The external memory slot 7 is constituted by a memory removable unit from which an external memory 8 formed from a semiconductor storage medium, or the like is loaded/unloaded, an interface circuit for transmitting/receiving data, programs, etc., to and from an external memory loaded into the memory removable unit, and the like. The external memory 8 may also be a recording medium in which application programs including operation control programs according to the embodiment of the present invention, and the like are recorded. In this case, the mobile terminal 1 can obtain those application programs or the like from the external memory 8.

The audio processing unit 10 is a processing circuit for an audio signal input from a microphone 11 and an audio signal output to a speaker 12. The microphone 11 performs sound collection of external audio, sound collection of transmitted telephone conversation, and the like. The speaker 12 performs music reproduction, output of received telephone conversation, output of ringtone, and the like.

The display processing unit 13 includes an image signal processing circuit that generates an image signal to be displayed on the display 14, and a driving circuit that drives the display of the display 14 on the basis of the image signal. The display 14 is a display panel formed from, for example, a liquid-crystal panel or an organic EL panel. On the display 14, display images, such as a mail display screen, a Web screen, and a character input screen, a still image, a moving image, and the like are displayed.

The image-capture control computation unit 15, under the control of the control unit 3, allows for the execution of an image-capture operation and an automatic focusing operation of an auto-focus mechanism in a camera unit 16, an automatic aperture adjustment operation of an auto-iris mechanism, a shutter speed adjustment operation of a shutter speed adjustment mechanism, a camera shake correction operation of a camera shake correction mechanism, and the like. Furthermore, the image-capture control computation unit 15 controls the light-emission driving circuit of a light-emitting unit 17 so as to cause the light-emitting unit 17 to perform a light-emitting operation for image-capturing illumination light and a light-emitting operation for image-capturing auxiliary light.

The camera unit 16 includes image-capturing elements for capturing a still image and a moving image, an optical system for forming a subject image on the image-capturing elements, an auto-focus mechanism that drives the lenses of the optical system so as to perform automatic focusing, an auto-iris mechanism that drives the aperture of the optical system so as to perform automatic aperture adjustment, a shutter speed adjustment mechanism that adjusts a shutter speed by mechanical or electronic type, a camera shake correction mechanism that corrects so-called camera shake, a driving circuit for driving those mechanisms, and the like.

The light-emitting unit 17 is formed of a lighting unit (not shown), and a light-emission driving circuit. The lighting unit is formed of an LED for emitting image-capturing illumination light for illuminating a subject at the time of image capture using the camera unit 16, or image-capturing auxiliary light for obtaining brightness at which auto-focus is operated normally. The light-emission driving circuit drives the lighting unit so as to emit light.

The IC 35 corresponds to an IC 35 for the touch panel unit 30 described above (see FIG. 1), and includes a touch-panel scanning unit 35a, an object type detection unit 35b, and an operation position detection unit 35c. The touch-panel scanning unit 35a scans the X-Y transparent electrode pattern part 31 (see FIG. 1) of the touch panel device 20 so as to detect a change in electrostatic capacitances in the X and Y directions, and also obtains the coordinate values of the square transparent electrode units in which the electrostatic capacitance has changed. The information on the coordinate values obtained by the touch-panel scanning unit 35a and the changed electrostatic capacitance value is sent to an object type determination unit 35b and an operation position detection unit 35c.

The object type determination unit 35b determines the type of the object that comes close to or comes into contact with the touch panel unit 30 on the basis of the information obtained from the shape of the distribution in the X direction or in the Y direction, of the electrostatic capacitance values that are detected by the touch scanning unit 35a. As described above, the operation position detection unit 35c calculates the touch position for an area of the touch panel unit 30 touched by an object, such as a user's finger, and thus identifies the coordinates (operation position) on the touch panel in which the operation has been performed using the user's finger or the like. Examples of a touch position calculation method include a method of calculating the position of the center of gravity in the touched area between the object and the touch panel unit 30. The calculation of the center of gravity position rc can be performed by using the equations below. In the equations below, "m" indicates the electrostatic capacitance value detected by each transparent electrode unit, "M" indicates the total sum of the electrostatic capacitance values that are detected by the transparent electrode units, and "ri" indicates the coordinates of each transparent electrode unit.

$$\sum_i m_i = M \qquad \text{(Equation 1)}$$

$$r_c = \frac{\sum_i m_i r_i}{M} \qquad \text{(Equation 2)}$$

The operation position information calculated by the operation position detection unit 35c is sent to the control unit 3. The details of the operation position calculation method will be described later.

The touch panel device 20 includes the touch panel unit 30, as described above with reference to FIGS. 1 and 2.

The portable terminal of the present embodiment, though its illustration is omitted in FIG. 5, includes components that are provided in a typical portable terminal 1, the components being such as a clock unit for measuring a time period and time, a battery for supping electric power to each unit, a power management IC for controlling the electric power, a digital broadcast receiving module for receiving a digital television broadcast and a digital radio broadcast, for example, a non-contact communication module for performing non-contact communication, which is used in so-called RFID (Radio Frequency-Identification), a non-contact type IC card or the like, a GPS module for obtaining the latitude and the longitude of the current position of the portable terminal by using a GPS signal from a GPS (Global Positioning System) geodetic satellite, a short-distance wireless communication unit for a wireless LAN and Bluetooth (registered trademark), for example, various sensor units, such as a gravity sensor, an inclination sensor, an acceleration sensor, a direction sensor, a temperature sensor, a humidity sensor, and an illumination sensor.

[4. Example of Calculation of Data Extraction Threshold Value for Calculating Touch Position]

Next, a description will be given of a method of calculating a data extraction threshold value for calculating a touch position according to the present exemplary embodiment. In the present disclosure, the data extraction threshold value for calculating a touch position is changed in accordance with information (parameters) obtained from the distribution shape of the electrostatic capacitance values obtained by the touch-panel scanning unit 35a (see FIG. 5).

The purpose of performing such control is to be able to most appropriately calculate the touch position even when an object of any size is touched, and is to be able to accurately obtain the position (coordinates) of an operation input by the user as much as possible. In other words, the purpose is to make the path of the movement of the operation position, which is obtained as a detection result, as infinitely close to the path that is actually input by the user as possible.

For this purpose, it is sufficient that "data suitable for the calculation of the touch position" is extracted, and the touch position is calculated by using the values thereof. The inventors of the present disclosure have become aware that "data suitable for the calculation of the touch position" can be defined by using the features of the distribution shape of the electrostatic capacitance values. The distribution shape that allows easy calculation of the touch position is a shape that satisfies the following two conditions.

(1) The distribution of signal levels that are effective for position detection computation is not uniform, and the number of inflected portions of signal levels in the distribution is as small as possible.

(2) In an area that is sufficiently large for the intervals in which physical electrodes are arranged, a signal that is effective for position detection computation is obtained.

The shape of (1) is obtained at a place having a peak (nearly) in the center thereof and where the difference of the signal levels that are obtained between adjacent electrodes is large. The "area" shown in (2) appears as a horizontal width at a place having the same value as the data extraction threshold value for calculating a touch position in the distribution shape of the electrostatic capacitance values. Specifically, in the case that the pitch of X-Y electrodes is 5 mm, and in the case that the disposed area on the surface of the finger serving as an input object is 7 mm, it can be seen that when this width is set to 5 mm, the touch position can be calculated most appropriately. In the following description, this width will be referred to as an "optimum threshold width".

At which place within the distribution shape of the electrostatic capacitance values that are actually detected, such a distribution shape most appropriate for the calculation of the touch position appears changes in accordance with the size of the object. In other words, it is possible to identify the "place at which the 'distribution shape most appropriate for the calculation of the touch position'" can be extracted on the basis of the information of the distribution shape of the electrostatic capacitance values that are actually detected, which changes in accordance with the size of the object. Then, by setting the data extraction threshold value for calculating a touch position at that place, it is possible to extract data most appropriate for the calculation of the touch position.

Figure 6:
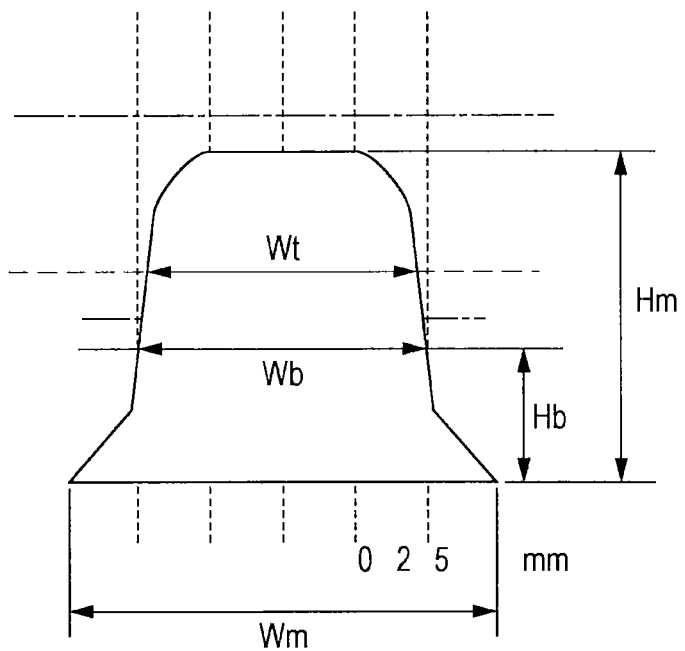
FIG. 6 is an illustration showing an example of parameters forming the distribution shape of electrostatic capacitance values that are detected by the touch-panel scanning unit in an exemplary embodiment of the disclosure.

FIG. 6 illustrates information that is considered to contribute to the identification of the "distribution shape most appropriate for the calculation of the touch position" within the information obtained from the distribution shape of the electrostatic capacitance values. The horizontal axis of FIG. 6 represents the X direction of the X-Y transparent electrode pattern part 31 (see FIG. 1), and the vertical axis represents the magnitude of the signal level of the detected electrostatic capacitance value. The distribution of the electrostatic capacitance values, shown in FIG. 6, is obtained in the case that an object having a diameter of 7 mm, for which an index finger is assumed, is touched.

The maximum height Hm indicates the height of a place where the electrostatic capacitance value is highest in the distribution shape, and the width Wm of the bottom side indicates the width in the X direction (or in the Y direction) of the place where the signal level is lowest among the electrostatic capacitance values that change as the object comes closer. The on-threshold width Wt indicates the horizontal width of the portion where the signal level signal having the same value as the touch determination threshold value Th1, and the optimum threshold width Wb, as described above, indicates the width that is considered to be the most appropriate as the horizontal width of the portion having the same value as the data extraction threshold value Th2 for calculating a touch position. The optimum threshold height Hb indicates the height from the spot (spot at which the width Wm of the bottom side is formed) at the bottom where the signal level is lowest up to the optimum threshold width Wb.

Examples of specific techniques for extracting the "distribution shape most appropriate for the calculation of the touch position" by using these parameters, that is, for optimizing the data extraction threshold value Th2 for calculating a touch position are the following three techniques.

(Technique 1) Adjustment of optimum threshold height Hb in accordance with size of width Wm of bottom side (Technique 2) Adjustment of optimum threshold height Hb so that optimum threshold width Wb (first width) becomes same value as optimum threshold width Wb (second width: for example, 5 mm) that is set by using index finger as model (Technique 3) Adjustment of optimum threshold height Hb on the basis of information of angle of curve in distribution shape The techniques are not limited to these, and a technique other than these may be applied as long as the technique is capable of extracting the "distribution shape most appropriate for the calculation of the touch position" described in (1) and (2) above.

Figure 7:
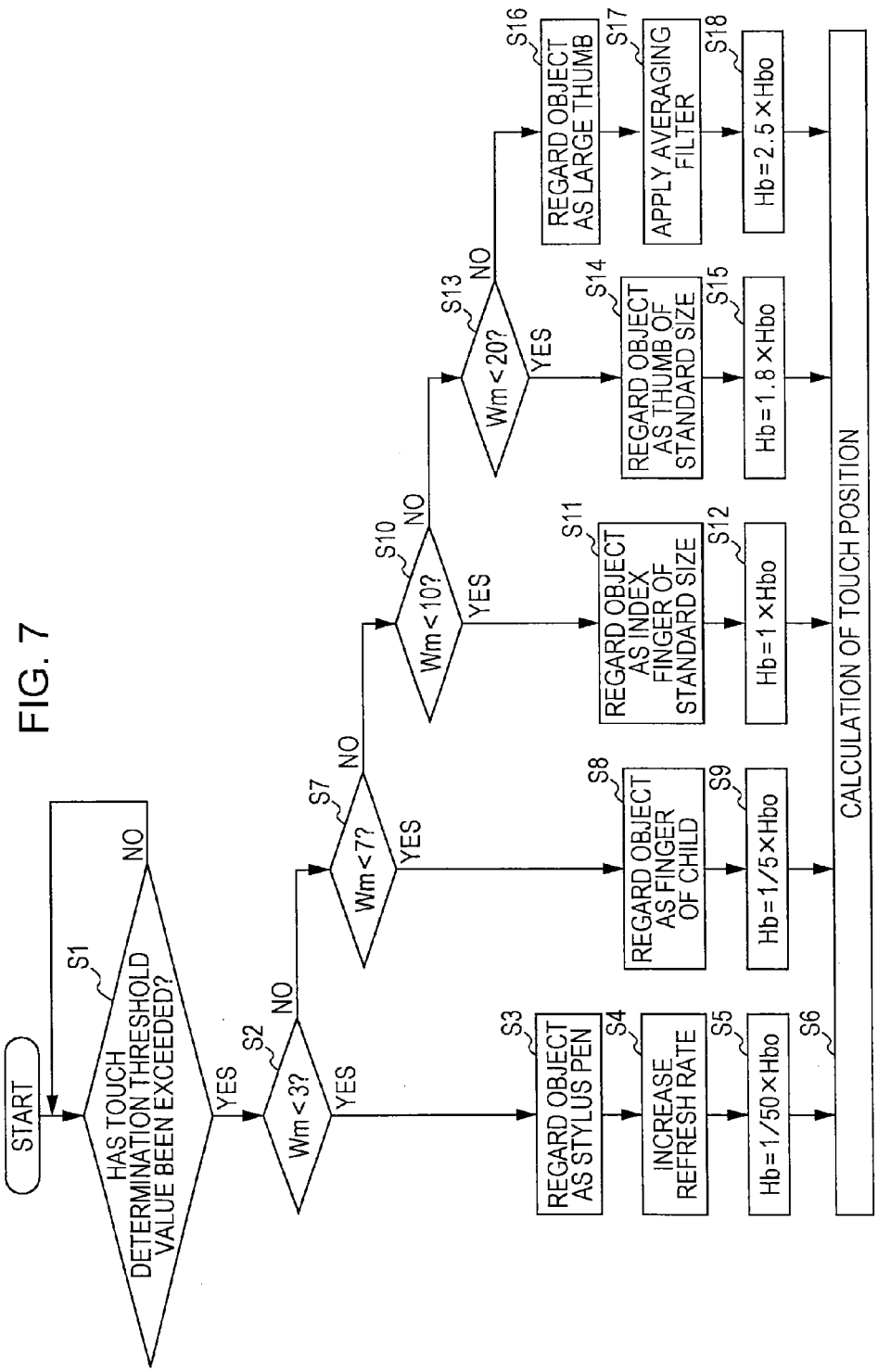
FIG. 7 is a flowchart illustrating an example of an optimization process for a data extraction threshold value for calculating a touch position in an exemplary embodiment of the present disclosure.

First, the optimization of the data extraction threshold value Th2 for calculating a touch position in accordance with the technique 1 will be described with reference to the flowchart of FIG. 7. Initially, it is determined whether or not the electrostatic capacitance value detected by the touch-panel scanning unit 35a (see FIG. 5) exceeds the touch determination threshold value Th1 (step S1). When it does not exceed the touch determination threshold value Th1, the determination of step S1 is continued. When it exceeds the touch determination threshold value Th1, next, it is determined whether or not the width Wm of the bottom side of the distribution is smaller than 3 mm (step S2).

When the width Wm of the bottom side is smaller than 3 mm, it is determined that the touched object is a stylus pen (step S3), and the refresh rate of the scanning by the touch-panel scanning unit 35a (see FIG. 5) is increased (step S4). As a result of increasing the refresh rate, a time-related interval at which the combination of the electrostatic capacitance value and the address of the electrode is output to the object type detection unit 35b and the operation position detection unit 35c (see FIG. 5) is shortened. At the same time, the time-related interval at which the position coordinates detected by the operation position detection unit 35c are output to the control unit 3 is shortened. As a result, the followability of an input path is improved with respect to an operation, such as a character input using a pen or the like. This is countermeasures for the fact that the input speed of transcription input using a pen or the like is higher than input using a finger for a human being. Thus, it becomes possible to automatically realize followability suitable for transcription input without causing the user to perform an additional process.

Next, the data extraction threshold value Th2 for calculating a touch position is set to a value at which the optimum threshold height Hb becomes 1/50×the value Hbo of the data extraction threshold value Th2 for calculating a touch position, which has hitherto been provided in a fixed manner, (step S5). Then, the calculation of the touch position is performed by using data exceeding the set data extraction threshold value Th2 for calculating a touch position (step S6).

When it is determined in step S2 that the width Wm of the bottom side is greater than or equal to 3 mm, next, it is determined whether the width Wm of the bottom side is smaller than 7 mm (step S7). When the width Wm of the bottom side is smaller than 7 mm, the object type detection unit 35b determines that the touched object is an index finger having a standard size (step S8). Then, the data extraction threshold value Th2 for calculating a touch position is set to a value at which the optimum threshold height Hb becomes 1/5×the value Hbo of the existing data extraction threshold value Th2 for calculating a touch position (step S9), and the process proceeds to step S6.

When it is determined in step S7 that the width Wm of the bottom side is greater than or equal to 7 mm, next, it is determined whether the width Wm of the bottom side is smaller than 10 mm (step S10). When the width Wm of the bottom side is smaller than 10 mm, it is determined that that the touched object is an index finger having a size larger than a standard finger (step S11). Then, the data extraction threshold value Th2 for calculating a touch position is set to a value at which the optimum threshold height Hb becomes the same value as the value Hbo of the existing data extraction threshold value Th2 for calculating a touch position (step S12), and the process proceeds to step S6. That is, the value Hbo of the data extraction threshold value Th2 for calculating a touch position that has hitherto been set is used as is.

When it is determined in step S10 that the width Wm of the bottom side is greater than or equal to 10 mm, it is determined next whether the width Wm of the bottom side is smaller than 20 mm (step S13). When the width Wm of the bottom side is smaller than 20 mm, the object type detection unit 35b determines that the touched object is a thumb having a standard size (step S14). In more detail, then, the data extraction threshold value Th2 for calculating a touch position is set to a value at which the optimum threshold height Hb becomes 1.8× the value Hbo of the existing data extraction threshold value Th2 for calculating a touch position (step S15), and the process proceeds to step S6.

When it is determined in step S10 that the width Wm of the bottom side is greater than or equal to 20 mm, the object type detection unit 35b determines that the touched object is a thumb having a large size (step S16), and applies an averaging filter (step S17). Here, by averaging the electrostatic capacitance values in the time-axial direction, the value of the threshold value serving as material for judging the detection value as the "amount of movement" is increased, so that the sensitivity thereof is decreased.

In a case where an object having a very large diameter, a sort of extra-standard size, is touched, a phenomenon may occur in which the detected electrostatic capacitance value greatly differs depending on the touch position in a case where the touch position traverses between electrodes. In a case where a very large object, such as, for example, a thumb of a user having a large hand, performs a touch operation, the detected signal level is saturated in the central portion other than the outer peripheral portion of the object, and there is negligible signal level difference between adjacent detection units. That is, a state occurs in which the "distribution of the signal levels that are effective for position detection computation is not uniform" of the requirement (1), which is described as the condition for "distribution shape that allows easy calculation of the touch position", is not satisfied. In such a case, a very small change in the signal level in the outer peripheral portion of the object greatly affects the detection position, and the detection position is moved even if the user thinks that he/she has stopped moving his/her finger. By performing the process described in step S17, it becomes possible to suppress the occurrence of such a phenomenon. That is, even in the case where an object having an extra-standard size is touched, it becomes possible to accurately follow the path of the operation.

After the averaging filter is applied in step S17, the data extraction threshold value Th2 for calculating a touch position is set to a value at which the optimum threshold height Hb becomes 2.6× the value Hbo of the data extraction threshold value Th2 for calculating a touch position (step S18), and the process proceeds to step S6.

The values of the individual coefficients to be multiplied by the value Hbo in steps S5, S9, S12, S15, and S18 are set as values such that the optimum threshold width Wb becomes approximately the same degree of value as the optimum threshold width Wb (for example, 5 mm) that is set by using an index finger as a model. That is, the height at which the optimum threshold width Wb=5 mm can be realized is set in accordance with the size of the object. As a result of the optimum threshold width Wb=5 mm being realized, it becomes possible to extract data in a number necessary and sufficient to perform the calculation of the touch position. The values of the coefficients are examples, and optimal values are set as appropriate in accordance with the value that is set as the optimum threshold width Wb.

Figure 8:
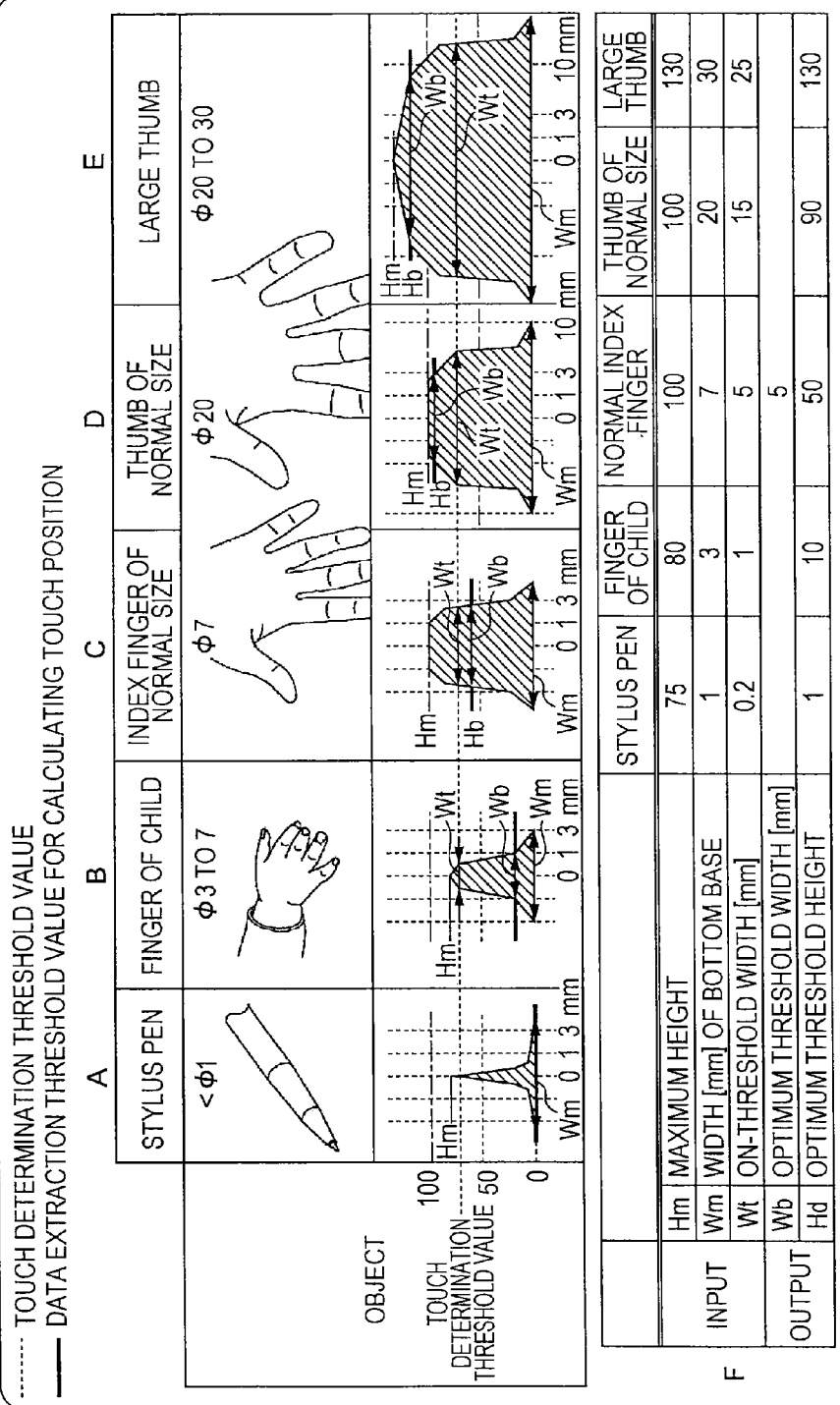
FIG. 8 is an illustration showing the relationship between the detection width of an object and the type of the object in an X direction (horizontal direction) and in a Y direction (vertical direction) of the touch panel in an exemplary embodiment of the present disclosure.

FIG. 8 illustrates an example in which the data extraction threshold value Th2 for calculating a touch position has been optimized by the above-mentioned technique 1. The horizontal axis of FIG. 8 represents the X direction of the X-Y transparent electrode pattern part 31 (see FIG. 1), and the vertical axis represents the magnitude of the signal level of the detected electrostatic capacitance value.

FIG. 8A illustrates the distribution shape of electrostatic capacitance values in a case where a very fine object, such as a stylus pen, whose diameter is considered to be smaller than the 3 mm, is touched. FIG. 8B illustrates the distribution shape of electrostatic capacitance values in a case where a fine object, such as a finger of a child, whose diameter is considered to be smaller than the 7 mm, is touched. FIG. 8C illustrates the distribution shape of electrostatic capacitance values in a case where an index finger, whose diameter is considered to be approximately 7 mm, is touched. FIG. 8D illustrates the distribution shape of electrostatic capacitance values in a case where a thumb of a standard size, whose diameter is considered to be greater than or equal to 7 mm and smaller than the 20 mm, is touched. FIG. 8E illustrates the distribution shape of electrostatic capacitance values in the case of a thumb having a large size, whose diameter is considered to be greater than or equal to 20 mm. FIG. 8 illustrates, for each object of each size, examples of individual parameters forming the distribution shape of the electrostatic capacitance values.

As shown in FIG. 8A, in a case where an object whose diameter is very small, such as a pen, is touched, the maximum height Hm of the distribution shape of the electrostatic capacitance values becomes as low as 75 mm, and the width Wm of the bottom side becomes as very small as 1 mm. When the data extraction threshold value Th2 for calculating a touch position is set to an existing value with respect to an object of such a distribution shape, the number of values that are sampled as touch position calculation data is decreased to a very small number. That is, the accuracy of the calculated touch position becomes low.

In contrast, according to the above-mentioned technique 1, the optimum threshold height Hb from the bottom side to the data extraction threshold value Th2 for calculating a touch position is value Hbo×⅕₀=1 mm. That is, the value of the data extraction threshold value Th2 for calculating a touch position is set to a very small value. Then, as a result of the optimum threshold width Wb=5 mm being realized, it becomes possible to extract data in a number necessary and sufficient to calculate the touch position.

In a case where an object whose diameter is small, such as a finger of a child, is touched, as shown in FIG. 8B, the maximum height Hm of the distribution shape of the electrostatic capacitance values is as low as 80 mm, and the width Wm of the bottom side is as small as 3 mm. In contrast, according to the above-mentioned technique 1, the optimum threshold height Hb from the bottom side to the data extraction threshold value Th2 for calculating a touch position is value Hbo×⅕=10 mm, and the optimum threshold width Wb=5 mm is realized.

As shown in FIG. 8C, in a case where an object that is assumed to be an index finger having a standard size is touched, the existing value Hbo is applied to the data extraction threshold value Th2 for calculating a touch position. That is, it is possible to most appropriately calculate the touch position in the same manner as until now.

As shown in FIG. 8D, in a case where an object having a large diameter, such as a thumb having a standard size is touched, the maximum height Hm of the distribution shape of the electrostatic capacitance values becomes approximately 100 mm, which is not different from the case in which an index finger is touched. On the other hand, the width Wm of the bottom side becomes to be as large as 20 mm. When the data extraction threshold value Th2 for calculating a touch position is set to an existing value with respect to an object of such a distribution shape, the distribution shape of the data to be extracted is a shape close to a trapezoid. That is, it follows that a large number of data at places where there is hardly no difference between signal levels that are detected between adjacent electrodes is extracted. In a case where the touch position is calculated by using such data, the possibility that a position differing from the original touch position of the object is calculated as the touch position becomes high.

In contrast, according to the above-mentioned technique 1, the optimum threshold height Hb from the bottom side to the data extraction threshold value Th2 for calculating a touch position is value Hbo×1.8=90 mm, which is higher than the optimum threshold height Hb (50 mm) in the distribution shape of the electrostatic capacitance values in a case where the index finger is touched. As a result, the distribution shape in which the data extraction threshold value Th2 for calculating a touch position is at the bottom side is closer to a triangle. That is, since data at a place where the difference of the signal levels between adjacent electrodes is large is extracted, the optimal touch position can be calculated.

Also in a case where a thumb having a very large size is touched, the same advantages are obtained. Also, in this case, as shown in FIG. 8E, the maximum height Hm of the distribution shape of the electrostatic capacitance values becomes approximately 100 mm, which is the same as in the case in which the index finger is touched. On the other hand, the width Wm of the bottom side becomes as very large as 30 mm. When the data extraction threshold value Th2 for calculating a touch position is set to an existing value with respect to an object of such a distribution shape, the distribution shape of the extracted data is almost close to a trapezoid, and the lengths of the top bottom and the lower bottom of the trapezoid are very long.

In contrast, according to the above-mentioned technique 1, the optimum threshold height Hb from the bottom side to the data extraction threshold value Th2 for calculating a touch position is value Hbo×2.5=125 mm, which is very higher than the optimum threshold height Hb (50 mm) in the distribution shape of the electrostatic capacitance values in a case where the index finger is touched. As a result, the distribution shape in which the data extraction threshold value Th2 for calculating a touch position is at the bottom side is closer to a triangle. That is, since data at places where the differences of the signal levels in the adjacent electrodes are large is extracted, the optimal touch position can be calculated.

Figure 9:
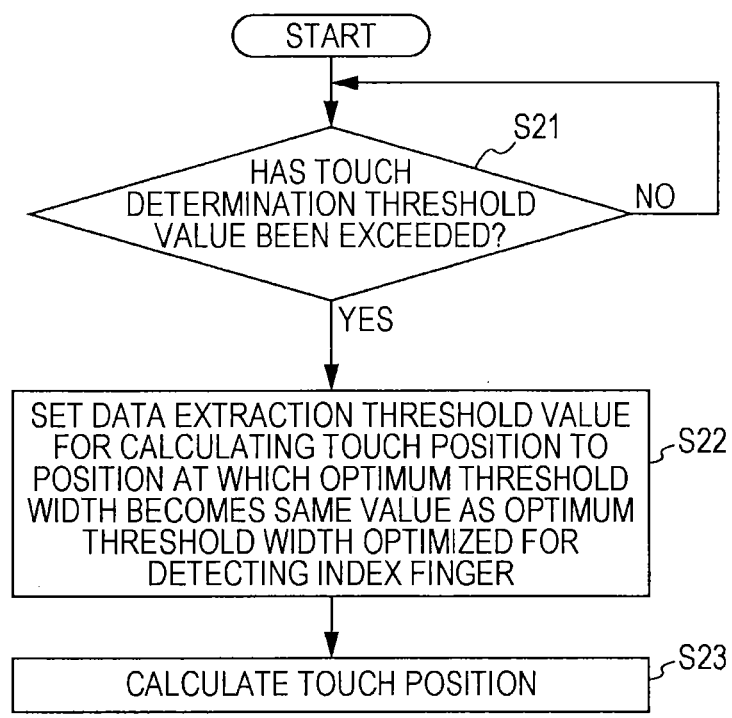
FIG. 9 is a flowchart illustrating an example of an optimization process for a data extraction threshold value for calculating a touch position in an exemplary embodiment of the present disclosure.

Next, the optimization of the data extraction threshold value Th2 for calculating a touch position according to the above-mentioned technique 2 will be described with reference to the flowchart of FIG. 9. First, it is determined whether or not the electrostatic capacitance value detected by the touch-panel scanning unit 35a (see FIG. 5) exceeds the touch determination threshold value Th1. When it does not exceed the touch determination threshold value Th1, the determination of step S21 is continued. When it exceeds the touch determination threshold value Th1, next, the optimum threshold height Hb is set to a value equal to 5 mm, which is the optimum threshold width Wb that is set using an index finger as a model. Then, by using the data extraction threshold value Th2 for calculating a touch position, which has been optimized as the result of the adjustment, the calculation of the touch position is performed (step S23).

In the technique 2, also, the content desired to be realized is the same as the content desired to be solved in the technique 1. In the technique 2, the height at which the optimum threshold width Wb=5 mm is calculated by integrating the electrostatic capacitance values from the bottom side, and the height is set as the optimum threshold height Hb.

Next, the optimization of the data extraction threshold value Th2 for calculating a touch position in accordance with the technique 3 will be described with reference to the flowchart of FIG. 10. First, it is determined whether or not the electrostatic capacitance value detected by the touch-panel scanning unit 35a (see FIG. 5) exceeds the touch determination threshold value Th1 (step S31). When it does not exceed the touch determination threshold value Th1, the determination of step S31 is continued. When it exceeds the touch determination threshold value Th1, detection of the rate of change of the signal level distribution of the electrostatic capacitance values is performed (step S32).

Figure 11:
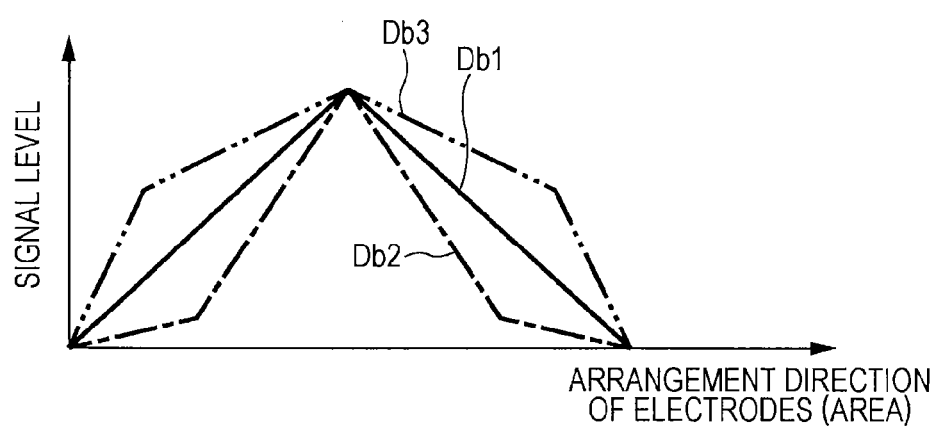
FIG. 11 is a graph illustrating examples of rates of change of signal levels in the distribution shape of electrostatic capacitances in an exemplary embodiment of the present disclosure.

The "rate of change of the signal level distribution" referred to herein indicates the rate of change of the signal levels in both areas with the center of the signal level distribution of the electrostatic capacitance values acting as a boundary. FIG. 11 illustrates, in graphs, examples of the rates of change of signal level distributions. The horizontal axis of FIG. 11 represents the X direction (or the Y direction) in the arrangement of electrodes, and the vertical axis represents the signal level. The distribution Db1 indicated by the solid line shows an example in which the rate of change of the signal level in the areas to the right and left with the center of the distribution acting as a boundary is constant. The distribution Db2 indicated by the short dashed line shows an example in which the rate of change of the signal levels in the areas to the right and left of the center with the center of the distribution acting as a boundary is increased with respect to the center. The distribution Db3 indicated by the alternate long and two short dashes line shows an example in which the rate of change of the signal levels in the right and left areas with the center of the distribution acting as a boundary is decreased with respect to the center.

Figure 10:
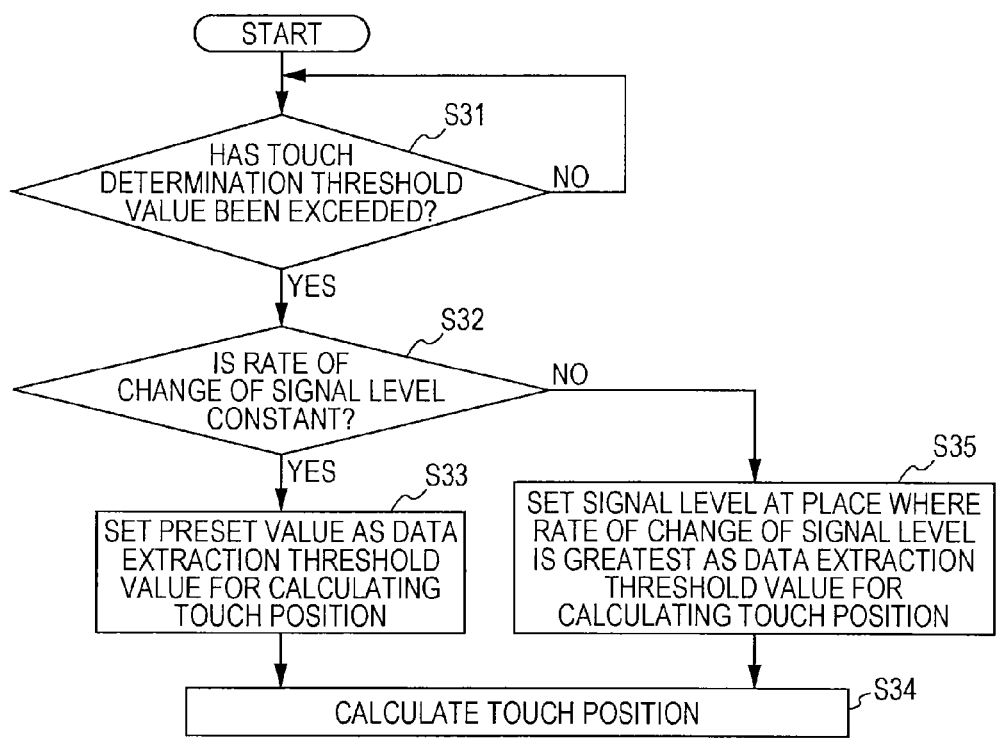
FIG. 10 is a flowchart illustrating an example of an optimization process for a data extraction threshold value for calculating a touch position in an exemplary embodiment of the present disclosure.

Referring back to the flowchart of FIG. 10, a description is continued. In a case where the rate of change of the signal level distribution detected in step S32 is constant, a prespecified predetermined value is set as the data extraction threshold value Th2 for calculating a touch position (step S33). Then, the calculation of the touch position is performed by using the set data extraction threshold value Th2 for calculating a touch position (step S34). When the rate of change of the signal level distribution detected in step S32 is not constant, that is, when the rate of change of the signal level distribution is a distribution, such as the distribution Db2 or the distribution Db3 shown in FIG. 12, the signal level value at a place where the rate of change of the signal level is greatest is set as the data extraction threshold value Th2 for calculating a touch position (step S35). Then, by using the data extraction threshold value Th2 for calculating a touch position, the calculation of the touch position is performed (step S34).

As a result of performing such a process, in a case where, as shown in, for example, FIGS. 8A and 8B, an object having a small diameter is touched, the signal level value at the place where the rate of change of the signal level is greatest is set to the data extraction threshold value Th2 for calculating a touch position. That is, the optimum threshold height Hb is set to a place where the inclination of the distribution shape is sharpest. As shown in FIGS. 8A and 8B, in the distribution shape in which the width Wm of the bottom side is small, the place where the rate of change of the signal level is greatest appears at the position (the position of the boundary between a place where the curve of the distribution shape is moderate and a place where it is sharp) close to the bottom side. Therefore, the data extraction threshold value Th2 for calculating a touch position is set to a value that is greatly smaller than the value of the data extraction threshold value Th2 for calculating a touch position, which has hitherto been set in a fixed manner. As a result, it is possible to greatly increase the number of data that is extracted using the data extraction threshold value Th2 for calculating a touch position when compared to the related art. As a result, it becomes possible to improve the calculation accuracy of the touch position.

On the other hand, in a case where, for example, as shown in FIGS. 8D and 8E, an object having a large diameter is touched, the place at which the rate of change of the signal level is greatest appears at a spot at which the place where the inclination of the distribution shape is sharpest ends. The spot at which the place where the inclination of the distribution shape is sharpest exists in the vicinity of the apex (center) of the distribution shape, as shown in FIGS. 8D and 8E. Therefore, the data extraction threshold value Th2 for calculating a touch position is set to near the apex of the distribution shape.

As a result, the distribution shape that is extracted by using the data extraction threshold value Th2 for calculating a touch position at the bottom side becomes a distribution shape that allows easy calculation of the touch position. In other words, it becomes possible to extract a place, which has a peak in the center of the distribution shape and in which the difference of signal levels, which is obtained between adjacent electrodes, is large. As a result of performing the calculation of the touch position by using the data of the place, which is extracted in this manner, it is possible to greatly decrease an error between the calculated touch position and the coordinates of the position at which operation input is performed actually by the user to smaller than in the related art.

Figure 12:
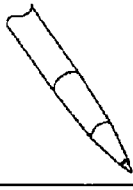
FIG. 12 is an illustration showing examples of comparisons between a result of follow-up of a path of operation input in an exemplary embodiment of the present disclosure, and a result of follow-up of a path of operation input by the technique of the related art.

FIG. 12 illustrates examples of results of the follow-up of a path of operation input in a case where the calculation of the touch position is performed by using the data extraction threshold value Th2 for calculating a touch position, which has hitherto been set in a fixed manner, and in a case where the calculation of the touch position is performed by the technique of the present disclosure. In the example shown in FIG. 12, the calculation of the touch position is performed by two methods, that is, the technique of the related art and the technique of the present disclosure, by moving objects of various sizes from the left upper end of the screen of the touch panel unit 30 straight to the right low end thereof.

In a case where a straight line is drawn by using an object having a diameter smaller than 3 mm, for which a stylus pen is assumed, according to the technique of the related art, continuousness is assumed in the path of the tracking result. The reason for this is that in a case where the diameter of the object is smaller than the intervals at which electrodes that sense an electrostatic capacitance value are disposed, the probability that an electrode does not exist in a place touched by the object increases. In such a place, the change in the electrostatic capacitance value is also not detected. Consequently, in practice, even when a straight line is input, the follow-up result shows that fine lines are continuous discretely.

In contrast, according to the present disclosure, in a case where an object having a diameter smaller than 3 mm is touched, the data extraction threshold value Th2 for calculating a touch position is set to a very low value on the basis of the distribution shape of the electrostatic capacitance values. As a result, the number of data that is extracted as touch position calculation data is greatly increased when compared to the technique of the related art. Therefore, as shown as the "technique of the present disclosure" in FIG. 12, the follow-up result of the operation input becomes continuous.

Even in the case that an operation input is performed using an object having a diameter of 3 mm to 7 mm, for which a finger of a child is assumed, similarly to the case where input is performed using an object for which a stylus pen is assumed, the data extraction threshold value Th2 for calculating a touch position is set to a value lower than the existing value. As a result, the number of data that is extracted as the touch position calculation data increases when compared to the technique of the related art. Consequently, as shown as the "technique of the present disclosure" in FIG. 12, it is possible to make the follow-up result of the operation input almost equal to the path of the actual input.

In a case where a straight line is drawn by using an object having a diameter of 20 mm, which is assumed to be the same as a thumb of normal size, according to the technique of the related art, the path of the tracking result swings to the left and right. In a case where the diameter of the object is large, as shown in FIG. 8D, the distribution shape of the electrostatic capacitance values is close to a trapezoid, and the upper side and the lower side of the trapezoid increase. In a case where the existing data extraction threshold value Th2 for calculating a touch position, which has been calibrated with the index finger, is applied to a data group having such feature quantities, all the data to be extracted becomes such that there is not much difference in the signal levels between adjacent electrodes, and the signal level is high. The reason for this is that as a result of the above, an error is likely to occur at the calculated touch position.

In a case where a straight line, such as that shown in FIG. 8E, is drawn using a large extra-standard finger, this error is more conspicuous. The follow-up result of the operation input shows a portion having no continuousness and deviating from the actual path, as shown in FIG. 12.

In contrast, according to the technique of the present disclosure, in a case where an object having a diameter greater than or equal to 7 mm is touched, the data extraction threshold value Th2 for calculating a touch position is set to a high value on the basis of the distribution shape of the electrostatic capacitance values. As a result, a place which has a peak in the center of the distribution shape and in which the difference in signal levels that are obtained between adjacent electrodes is large is extracted as touch position calculation data. Consequently, continuousness occurs in the follow-up result of the operation input, and an error with the path of the actual operation input decreases to be very small.

That is, according to the present embodiment, when an object of any size touches the touch panel, it is possible to appropriately calculate the touch position of a position at which operation has been performed. Consequently, it is possible to improve linearity in the follow-up of operation.

Furthermore, according to the above-described embodiment, the type of object is appropriately recognized by the operation position detection unit 35c in accordance with the width (the width Wm of the bottom side of the distribution shape) in the X direction and in the Y direction, of the electrostatic capacitance values detected by the touch-panel scanning unit 35a (see FIG. 5). FIG. 13 illustrates, in a graph, the type of object that can be recognized by the detection method of the present disclosure. The horizontal axis of the graph represents the width of an object that is detected in the X direction, and the vertical axis thereof represents the width of the object that is detected in the Y direction. According to the detection method of the present disclosure, when both the width detected in the X direction and the width detected in the Y direction are smaller than 3 mm, the touched object is recognized to be a stylus pen.

Even when the width detected in the X direction or in the Y direction is smaller than 3 mm, in the case that the width detected in the other direction is 3 mm to 20 mm, the touched object is recognized to be a finger (index finger). When the width detected in the X direction or in the Y direction is 3 mm to 7 mm, if the width detected in the other direction is in a range of 3 mm to 20 mm, the touched object is recognized to be a finger (index finger).

In the case that the width detected in the X direction or in the Y direction is 7 mm to 20 mm, if the width detected in the other direction is in a range of 0 mm to 20 mm, the touched object is recognized to be a finger (index finger). In the case of a width in a range of 20 mm to 30 mm, the touched object is recognized to be a large finger (thumb) having an extra-standard size. When a width of 20 mm to 30 mm is detected in one of the X direction and the Y direction, if the width detected in the other direction is 7 mm to 20 mm, the touched object is recognized to be a large finger (thumb having an extra-standard size). The values shown in FIG. 13 are examples, and other optimal values may be set according to designs.

As described above, as a result of recognizing the type of the object on the basis of the distribution width of the electrostatic capacitance values of electrodes, which are detected in the X direction and in the Y direction, it is also possible to optimize post-processing of operation position detection in accordance with the type of the object.

When, for example, the type of the recognized object is a stylus pen, as described with reference to the flowchart of FIG. 7, by increasing the refresh rate, it becomes possible to follow quick motion of pen input in real time. Furthermore, when the type of the recognized object is a thumb having an extra-standard size, an averaging filter is applied to the electrostatic capacitance values that are detected by the touch-panel scanning unit 35a (see FIG. 5) and are subjected to A/D conversion, thereby suppressing the occurrence of jitter.

By performing such adjustments in accordance with the type of the detected object, it becomes possible to pass data optimized for each application, in which inputs from various object bodies are assumed, to the application side. For example, in an application for browsing a map, operation of what is commonly called pinch/zoom, which enables expansion/reduction by using a thumb and an index finger, is often used. According to the present case, by performing position detection setting most appropriate for each of the index finger and the thumb, it is possible to realize ease of operation adapted to the intent of the user.

Furthermore, also, in a game application in which a 3D graphic object is operated by the user, position detection setting most appropriate for each of the index finger and the thumb is performed to an operation, such as pinching or rotation, by using the thumb and the index finger, thereby realizing ease of operation adapted to the intent of the user. Furthermore, also, in an application in which a pen and finger input are used together, that is, in an application in which pages are turned using the left hand while taking notes on the touch screen by using the right hand, it is possible to perform position detection setting most appropriate for an individual input object.

In addition, for all the above, according to the present case, it is not necessary to cause the user to perform additional setting operation, and furthermore, a special communication process is not necessary on the application and the CPU side. The present case particularly exhibits effects in a use case in which it is difficult to estimate at what time and at which place a plurality of input objects having different features are input.

The series of processing in the above-described embodiments can be performed by hardware and also by software. When the series of processing is to be performed by software, the series of processing can be performed by a computer in which a program constituting the software is incorporated in dedicated hardware, or by a computer in which a program for executing various functions is installed. For example, a program constituting desired software may be installed into a general-purpose computer or the like, whereby the program is executed.

Furthermore, a recording medium having recorded thereon program codes of software that realizes the functions of the above-described exemplary embodiments may be supplied to a system or an apparatus. Furthermore, of course, the functions are realized by a computer (or a control device, such as a CPU) of the system or the apparatus by reading program codes stored on a recording medium and executing them.

Examples of usable recording media for supplying program codes in this case include a flexible disk, a hard disk, an optical disc, a magneto-optical disc, a CD-ROM, a CD-R, a magnetic tape, a non-volatile memory card, and a ROM.

Furthermore, by executing program codes that are read by the computer, the functions of the above-described exemplary embodiments are realized. In addition, an OS or the like, which runs on the computer, performs part or the whole of actual processing on the basis of the instructions of the program codes. A case in which the functions of the above-described exemplary embodiments are realized by the processes is also included.

The present disclosure is not limited to the above-mentioned exemplary embodiments and, of course, other various application examples and modifications can be taken without departing from the gist of the present disclosure described in the claims. It should be understood of course by those skilled in the art that various modifications, combinations, and other embodiments may be made according to the design or other elements insofar as they come within the scope of the claims or the equivalence thereof.

The present disclosure may take the following configurations.

(1) A touch panel device including:
an electrostatic-capacitance-type touch panel unit in which a plurality of transparent electrodes are arranged in an X direction and in a Y direction;
an electrical potential detection unit configured to scan the plurality of transparent electrodes and detect changes in electrostatic capacitance values at coordinates in the X direction and in the Y direction;
an object type detection unit configured to detect a type of an object that has come close to or come into contact with the surface of the touch panel unit on the basis of information obtained from a distribution shape of electrostatic capacitance values detected by the electrical potential detection unit; and
an operation position detection unit configured to change an amount of data used to calculate a touch position of the object in accordance with the type of the object detected by the object type detection unit, and configured to detect the coordinates of a position at which the object has come close or come into contact on the basis of the touch position calculated using the changed-amount data.

(2) The touch panel device as set forth in (1), wherein the data used to calculate the touch position is data exceeding a preset data extraction threshold value for calculating a touch position.

(3) The touch panel device as set forth in (1) or (2), wherein the data extraction threshold value for calculating a touch position is set to a position at which a place where a difference between electrostatic capacitance values is large among the adjacent transparent electrodes can be extracted, a peak existing in the vicinity of the center of the distribution shape of the electrostatic capacitance values.

(4) The touch panel device as set forth in one of (1) to (3), wherein the data extraction threshold value for calculating a touch position is set to a value corresponding to the width of the bottom side of the distribution shape among parameters forming the distribution shape of the electrostatic capacitance values.

(5) The touch panel device as set forth in one of (1) to (4), wherein when the width of the bottom side of the distribution shape is small, the data extraction threshold value for calculating a touch position is set to a low value corresponding to the width, and when the width of the bottom side of the distribution shape is large, the data extraction threshold value for calculating a touch position is set to a high value corresponding to the width.

(6) The touch panel device as set forth in one of (1) to (3), wherein the data extraction threshold value for calculating a touch position is set to a value at which a first width that is a width of a portion having the same value as the data extraction threshold value for calculating a touch position in the distribution shape becomes the same value as a second width that is a width of a portion having the same value as the data extraction threshold value for calculating a touch position, which is optimized to calculate the touch position of an index finger of a person, in a distribution shape that is obtained when an object having a diameter supposed to be a diameter possessed by the index finger touches the touch panel device.

(7) The touch panel device as set forth in one of (1) to (3), wherein the data extraction threshold value for calculating a touch position is changed on the basis of the information on the inclination of the distribution shape among parameters forming the distribution shape of the electrostatic capacitance values.

(8) The touch panel device as set forth in one of (1) to (7), wherein the data extraction threshold value for calculating a touch position is set to a place where the inclination of the distribution shape is sharpest when the width of the bottom side of the distribution shape is smaller than a prespecified predetermined width, and the data extraction threshold value for calculating a touch position is set to a boundary, in which the electrostatic capacitance value is higher, of the boundaries between a place where the inclination of the distribution shape is sharpest and a place where the inclination is moderate when the width of the bottom side of the distribution shape is greater than or equal to a prespecified predetermined width.

(9) The touch panel device as set forth in one of (1) to (3), wherein when the width of the bottom side of the distribution shape is smaller than a preset predetermined width, the operation position detection unit determines that the object touching the touch panel device is a pen, and increases the rate of scanning by the electrical potential detection unit.

(10) The touch panel device as set forth in one of (1) to (9), wherein the predetermined width is 3 mm.

(11) The touch panel device as set forth in one of (1) to (3), wherein when the width of the bottom side of the distribution shape is larger than or equal to a preset predetermined width, the operation position detection unit determines that the object touching the touch panel is a finger having a very large size, and applies an averaging filter to data scanned by the electrical potential detection unit.

(12) The touch panel device as set forth in one of (1) to (11), wherein the predetermined width is 20 mm.

(13) The touch panel device as set forth in one of (1) to (3), wherein the calculation of the touch position is performed on the basis of the touch position calculated on the basis of the information obtained from the distribution shape of the electrostatic capacitance values detected by the electrical potential detection unit.

(14) A mobile terminal including:
an electrostatic-capacitance-type touch panel unit in which a plurality of transparent electrodes are arranged in an X direction and in a Y direction; and
a control unit including an electrical potential detection unit configured to scan the plurality of transparent electrodes and detect changes in electrostatic capacitance values at coordinates in the X direction and in the Y direction, an object type detection unit configured to detect a type of object that comes close to or comes into contact with the surface of the touch panel unit on the basis of information obtained from a distribution shape of electrostatic capacitance values that are detected by the electrical potential detection unit, and an operation position detection unit configured to change an amount of data used to calculate a touch position of the object in accordance with the type of object detected by the object type detection unit, and configured to detect the coordinates of the position at which the object has come close or come into contact on the basis of the touch position calculated using the changed-amount data.

(15) A detection method including:
scanning a plurality of transparent electrodes of an electrostatic-capacitance-type touch panel unit, in which a plurality of transparent electrodes are arranged in an X direction and in a Y direction, and detecting changes in electrostatic capacitance values at coordinates in the X direction and in the Y direction;
detecting a type of object that comes close to or comes into contact with a surface of the touch panel unit on the basis of information obtained from a distribution shape of the detected electrostatic capacitance values; and
changing an amount of data used to calculate a touch position of the object in accordance with the type of the detected object, and detecting the coordinates of the position at which the object has come close or come into contact on the basis of the touch position calculated using the changed-amount data.

(16) A recording medium having recorded thereon a program for causing a computer to perform processing including:
scanning a plurality of transparent electrodes of an electrostatic-capacitance-type touch panel unit, in which a plurality of transparent electrodes are arranged in an X direction and in a Y direction, and detecting changes in electrostatic capacitance values at coordinates in the X direction and in the Y direction;
detecting a type of object that comes close to or comes into contact with a surface of the touch panel unit on the basis of information obtained from a distribution shape of the detected electrostatic capacitance values; and
changing an amount of data used to calculate a touch position of the object in accordance with the type of the detected object, and detecting the coordinates of the position at which the object has come close or come into contact on the basis of the touch position calculated using the changed-amount data.

REFERENCE SIGNS LIST

1 ... mobile terminal, 2 ... communication unit, 3 ... control unit, 4 ... button operation unit, 5 ... storage unit, 6 ... external input/output terminal unit, 7 ... external memory slot, 8 ... external memory, 10 ... audio processing unit, 11 ... microphone, 12 ... speaker, 13 ... display processing unit, 14 ... display, 15 ... image-capture control computation unit, 16 ... camera unit, 17 ... light-emitting unit, 20 ... touch panel device, 30 ... touch panel unit, 31 ... X-Y transparent electrode pattern part, 34 ... flexible printed substrate, 35 ... IC, 35a ... touch-panel scanning unit, 35b ... object type detection unit, 35c ... operation position detection unit, 36 ... sensor glass unit, 40X ... square transparent electrode unit, 40Y ... square transparent electrode unit, 43X ... outer edge wiring pattern, 43Y ... outer edge wiring pattern, 50 ... housing, 51 ... window glass, Th1 ... touch determination threshold value, Th2 ... data extraction threshold value for calculating touch position

What is claimed is:

1. A touch panel device comprising:
an electrostatic-capacitance-type touch panel unit having a plurality of transparent electrodes arranged in an X direction and in a Y direction;
an electrical potential detection unit configured to scan the plurality of transparent electrodes and detect electrostatic capacitance values at coordinates in the X direction and in the Y direction;
a memory configured to store an association of each of a plurality of types of objects, which include at least two different types of fingers of a user, to a different range of width values for a width of a bottom side of a distribution shape among parameters forming the distribution shape of the electrostatic capacitance values, the bottom side width representing a width on the touch panel unit where a signal level is lowest among the electrostatic capacitance values that change as the object comes closer to the touch panel unit; and
circuitry configured to
detect a type of an object, from the plurality of types of objects that has come within proximity to or come into contact with the surface of the touch panel unit on the basis of information obtained from a distribution shape of the electrostatic capacitance values detected by the electrical potential detection unit caused by only the one object coming within proximity to or coming into contact with the surface of the touch panel unit, and
on the basis of the type of object detected, change a data extraction threshold value used to calculate a touch position of the object, and detect coordinates of a position at which the object has come within proximity to or come into contact with the surface of the touch panel unit on the basis of the changed data extraction threshold value.

2. The touch panel device according to claim 1, wherein the data extraction threshold value for calculating a touch position is set to a position at which a place where a difference between electrostatic capacitance values is large among the adjacent transparent electrodes can be extracted, a peak existing in the vicinity of the center of the distribution shape of the electrostatic capacitance values.

3. The touch panel device according to claim 1, wherein the data extraction threshold value for calculating a touch position is set to a value corresponding to a width of a bottom side of a distribution shape among parameters forming the distribution shape of the electrostatic capacitance values.

4. The touch panel device according to claim 3, wherein when the width of the bottom side of the distribution shape is small, the data extraction threshold value for calculating a touch position is set to a low value corresponding to the width, and when the width of the bottom side of the distribution shape is large, the data extraction threshold value for calculating a touch position is set to a high value corresponding to the width.

5. The touch panel device according to claim 3, wherein when the width of the bottom side of the distribution shape is smaller than a predetermined width, the circuitry determines that the object touching the touch panel device is a pen or stylus, and increases the rate of scanning by the electrical potential detection unit.

6. The touch panel device according to claim 3, wherein when the width of the bottom side of the distribution shape is larger than or equal to a predetermined width, the circuitry determines that the object touching the touch panel is a finger having a very large size, and applies an averaging filter to data scanned by the electrical potential detection unit.

7. The touch panel device according to claim 1, wherein the data extraction threshold value for calculating a touch position is set to a value at which a first width that is a width of a portion having the same value as the data extraction threshold value for calculating a touch position in the distribution shape becomes the same value as a second width that is a width of a portion having the same value as the data extraction threshold value for calculating a touch position, which is optimized to calculate the touch position of an index finger of a person, in a distribution shape that is obtained when an object having a diameter supposed to be a diameter possessed by the index finger touches the touch panel device.

8. The touch panel device according to claim 1, wherein the data extraction threshold value for calculating a touch position is changed on the basis of the information on the inclination of the distribution shape among parameters forming the distribution shape of the electrostatic capacitance values.

9. The touch panel device according to claim 8, wherein the data extraction threshold value for calculating a touch position is set to a place where the inclination of the distribution shape is sharpest when the width of the bottom side of the distribution shape is smaller than a predetermined width, and the data extraction threshold value for calculating a touch position is set to a boundary, in which the electrostatic capacitance value is higher, of the boundaries between a place where the inclination of the distribution shape is sharpest and a place where the inclination is moderate when the width of the bottom side of the distribution shape is greater than or equal to a predetermined width.

10. A detection method, implemented on touch panel device including an electrostatic-capacitance-type touch panel unit having a plurality of transparent electrodes arranged in an X direction and in a Y direction, comprising:
storing an association of each of a plurality of types of objects, which include at least two different types of fingers of a user, to a different range of width values for a width of a bottom side of a distribution shape among parameters forming the distribution shape of the electrostatic capacitance values, the bottom side width representing a width on the touch panel unit where a signal level is lowest among the electrostatic capacitance values that change as the object comes closer to the touch panel unit;
scanning the plurality of transparent electrodes and detect electrostatic capacitance values at coordinates in the X direction and in the Y direction;

detecting a type of an object, from the plurality of types of objects that has come within proximity to or come into contact with the surface of the touch panel unit on the basis of information obtained from a distribution shape of the detected electrostatic capacitance values caused by only the one object coming within proximity to or coming into contact with the surface of the touch panel unit; and on the basis of the type of object detected, changing a data extraction threshold value used to calculate a touch position of the object, and detecting coordinates of a position at which the object has come within proximity to or come into contact with the surface of the touch panel unit on the basis of the changed data extraction threshold value.

11. A non-transitory computer readable storage medium having recorded thereon a program for causing a touch panel device including an electrostatic-capacitance-type touch panel unit, having a plurality of transparent electrodes arranged in an X direction and in a Y direction, to perform a method comprising:

storing an association of each of a plurality of types of objects, which include at least two different types of fingers of a user, to a different range of width values for a width of a bottom side of a distribution shape among parameters forming the distribution shape of the electrostatic capacitance values, the bottom side width representing a width on the touch panel unit where a signal level is lowest among the electrostatic capacitance values that change as the object comes closer to the touch panel unit;

scanning the plurality of transparent electrodes and detect electrostatic capacitance values at coordinates in the X direction and in the Y direction;

detecting a type of an object, from the plurality of types of objects that has come within proximity to or come into contact with the surface of the touch panel unit on the basis of information obtained from a distribution shape of the detected electrostatic capacitance values caused by only the one object coming within proximity to or coming into contact with the surface of the touch panel unit; and on the basis of the type of object detected, changing a data extraction threshold value used to calculate a touch position of the object, and detecting coordinates of a position at which the object has come within proximity to or come into contact with the surface of the touch panel unit on the basis of the changed data extraction threshold value.

* * * * *